(12) United States Patent
Kajioka et al.

(10) Patent No.: US 11,852,785 B2
(45) Date of Patent: Dec. 26, 2023

(54) TRANSPARENT ARTICLE HAVING A ROUGHENED UNEVEN SURFACE

(71) Applicant: NIPPON ELECTRIC GLASS CO., LTD., Otsu (JP)

(72) Inventors: Toshiyuki Kajioka, Otsu (JP); Koji Ikegami, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 1115 days.

(21) Appl. No.: 16/500,811

(22) PCT Filed: Apr. 6, 2018

(86) PCT No.: PCT/JP2018/014780
§ 371 (c)(1),
(2) Date: Oct. 3, 2019

(87) PCT Pub. No.: WO2018/190274
PCT Pub. Date: Oct. 18, 2018

(65) Prior Publication Data
US 2022/0404527 A1    Dec. 22, 2022

(30) Foreign Application Priority Data

Apr. 11, 2017 (JP) .................................. 2017-078326
Nov. 7, 2017 (JP) .................................. 2017-214300

(51) Int. Cl.
*G02B 5/02* (2006.01)
*G02B 1/113* (2015.01)

(52) U.S. Cl.
CPC .............. *G02B 1/113* (2013.01); *G02B 5/021* (2013.01); *G02B 2207/101* (2013.01)

(58) Field of Classification Search
CPC .. G02B 1/113; G02B 5/021; G02B 2207/101; G02B 1/00; G02B 1/10; G02B 1/11;
(Continued)

(56) References Cited

U.S. PATENT DOCUMENTS 8,598,771 B2    12/2013  Carlson et al.
9,734,590 B2     8/2017  Prakash
(Continued)

FOREIGN PATENT DOCUMENTS

CN         103502166 A      1/2014
CN         104834034 A      8/2015
(Continued)

OTHER PUBLICATIONS

Japanese Office Action dated Jan. 18, 2022, Japanese Patent Application No. 2017214300.
(Continued)

*Primary Examiner* — Arnel C Lavarias
(74) *Attorney, Agent, or Firm* — Cesari and McKenna, LLP (57) ABSTRACT

A transparent article in which sparkling on an anti-glare surface or other roughened relief surface is suppressed. The transparent article is provided with a transparent substrate, and a roughened relief surface provided to at least one surface of the transparent substrate. The relief surface has a surface roughness Sq of 50 nm or less measured in a spatial period of 20 μm or greater in the transverse direction.

6 Claims, 2 Drawing Sheets

(58) Field of Classification Search
CPC ........ G02B 1/118; G02B 5/02; G02B 5/0205; G02B 5/0221; G02B 5/0226; G02B 5/0268; G02B 5/0273; G02B 5/0278; G02B 5/0284; G02B 5/0289; G02B 5/0294
USPC .......... 359/601, 599, 609; 428/98, 141, 143, 428/144, 145, 156, 174, 221, 332
See application file for complete search history.

(56) References Cited

U.S. PATENT DOCUMENTS

| | | |
|---|---|---|
| 2007/0217015 A1 | 9/2007 | Furuya et al. |
| 2011/0062849 A1 | 3/2011 | Carlson et al. |
| 2012/0218640 A1 | 8/2012 | Gollier et al. |
| 2013/0107370 A1 | 5/2013 | Lander |
| 2015/0168610 A1* | 6/2015 | Fukui .................. B29C 33/3842 249/117 |
| 2016/0326047 A1 | 11/2016 | Mototani |
| 2017/0176254 A1 | 6/2017 | Ehbets |
| 2017/0285227 A1 | 10/2017 | Chen et al. |
| 2017/0327418 A1 | 11/2017 | Gollier et al. |
| 2018/0038995 A1 | 2/2018 | Fujii |
| 2018/0099307 A1 | 4/2018 | Takeda |
| 2018/0170800 A1 | 6/2018 | Inamoto et al. |
| 2018/0335659 A1 | 11/2018 | Takeda et al. |
| 2019/0248703 A1 | 8/2019 | Gollier et al. |
| 2019/0391303 A1 | 12/2019 | Ikegami et al. |
| 2020/0180210 A1* | 6/2020 | Kajioka .................. C03C 19/00 |
| 2020/0191999 A1 | 6/2020 | Kajioka et al. |
| 2020/0197978 A1 | 6/2020 | Kajioka et al. |
| 2021/0116607 A1 | 4/2021 | Kajioka et al. |
| 2022/0043184 A1* | 2/2022 | Saitoh .................. C03C 15/00 |

FOREIGN PATENT DOCUMENTS

| | | |
|---|---|---|
| CN | 105319616 A | 2/2016 |
| DE | 112014000995 T5 | 11/2015 |
| EP | 3505979 A1 | 3/2019 |
| JP | 10221506 A | 8/1998 |
| JP | 2002189107 A | 7/2002 |
| JP | 2003/222713 A | 8/2003 |
| JP | 2007/041514 A | 2/2007 |
| JP | 2007/187952 A | 7/2007 |
| JP | 2010/064932 A | 3/2010 |
| JP | 2011/047982 A | 3/2011 |
| JP | 2012/051175 A | 3/2012 |
| JP | 2012/093570 A | 5/2012 |
| JP | 2013/504514 A | 2/2013 |
| JP | 2014/059334 A | 4/2014 |
| JP | 2014513029 A | 5/2014 |
| JP | 2015196303 A | 11/2015 |
| JP | 5839134 B2 | 1/2016 |
| JP | 2016018068 A | 2/2016 |
| JP | 2016/6013378 B2 | 10/2016 |
| JP | 2017/538150 A | 12/2017 |
| JP | 2018-063419 A | 4/2018 |
| JP | 2018/077279 A | 5/2018 |
| JP | 2018-198050 A | 12/2018 |
| TW | 201710064 A | 3/2017 |
| WO | 2003/060573 A2 | 7/2003 |
| WO | 2012/118594 A1 | 9/2012 |
| WO | 2014/119453 A1 | 8/2014 |
| WO | 2015137196 A1 | 9/2015 |
| WO | 2015/163328 A1 | 10/2015 |
| WO | 2016/069113 A1 | 5/2016 |
| WO | 2016068112 A1 | 5/2016 |
| WO | 2016/181983 A1 | 11/2016 |

OTHER PUBLICATIONS

Chinese First Office Action dated Mar. 16, 2021, Chinese Patent Application No. 201880022327.5.
Akagaki,T. et al., "Effects of PEEK's surface roughness in seizure behaviors of PEEK/steel pairs under oil-lubricated sliding contacts", Mechanical Engineering Journal, vol. 4, No. 5, , pp. 1-10, (2017), 10 pages.
Liosi, A.I. "Development of a Simulation Tool for the Lubrication between the Piston Rings and the Cylinder Bore of an Internal Combustion Engine", Diploma Thesis, National Technical University of Athens, School of Mechanical Engineering Fluids Department, Parallel CFD & Optimization Unit, (2021), 125 pages.
Notice of Dispatch of Duplicates of a Written Opposition, mailed Feb. 17, 2023, Japanese Patent No. 7120241, 29 pages.
Reynaud, C. et al., "Quantitative determination of Young's modulus on a biphase polymer system using atomic force microscopy", Surf. Interface Anal. 30, pp. 185-189, (2000), 6 pages.
Takatou, H., et al. "Analysis of Steel Plate Surface Roughness", Journal of the Society of Instrument and Control Engineers, vol. 14, No. 10, pp. 757-765 (1975), 10 pages.
Cohen et al., "Surface Roughness and Texture: Considerations when Making the Change from R Parameters to S Parameters," Finishing & Coating website, Mar. 9, 2021, available at https://finishingandcoating.com/index.php/plating/567-surface-roughness-and-texture considerations when-making-the-change-from-rparameters-to-s-parameters, 12 pages.
Klapetek et al., "Gwyddion User Guide," 2012, 11 pages.

* cited by examiner

TRANSPARENT ARTICLE HAVING A ROUGHENED UNEVEN SURFACE

TECHNICAL FIELD

The present invention relates to a transparent article that includes a roughened uneven surface such as an anti-glare surface.

BACKGROUND ART

In order to improve the visual recognition of a display device, it has been suggested that the surface of a transparent article arranged on a display surface of the display device be a roughened anti-glare surface. Patent Document 1 discloses that sparkle (glare resulting from sparkle effect) can be reduced by setting the surface roughness Sq (RMS surface roughness) of an anti-glare surface arranged on the surface of a transparent glass panel to a certain range. Specifically, Patent Document 1 discloses that the sparkle can be reduced by setting a ratio (S1/S2) of a first surface roughness Sq (S1) of up to 300 nm, which is measured in a range of a spatial period of 40 µm to 640 µm in a transverse direction, to a second surface roughness Sq (S2), which is measured in a range of a spatial period of less than 20 µm in the transverse direction, to less than 3.9.

PRIOR ART LITERATURE

Patent Literature

Patent Document 1: Japanese Patent No. 6013378

SUMMARY OF THE INVENTION

Problem to be Solved by the Invention

There is a tendency in the sparkle of the transparent article arranged on the display surface of the display device to become more noticeable as the resolution of the display device increases. As the resolution of display devices increases, transparent articles need to reduce sparkle more effectively.

Accordingly, one object of the present invention is to provide a transparent article that reduces the sparkle on a roughened uneven surface such as an anti-glare surface.

Means for Solving the Problem

The present inventors have found that the sparkle of the transparent article is outstandingly reduced when the surface roughness Sq of the roughened uneven surface such as an anti-glare surface is 50 nm or less that is measured in a spatial period of 20 µm or greater in the transverse direction.

Specifically, a transparent article that solves the above-mentioned problem includes a transparent base material and a roughened uneven surface arranged on at least one surface of the transparent base material. The uneven surface has a surface roughness Sq of 50 nm or less that is measured in a spatial period of 20 µm or greater in a transverse direction.

Preferably, the surface roughness Sq of the uneven surface of the transparent article is 5 nm or greater that is measured in a spatial period of 20 µm or greater in the transverse direction.

Preferably, the surface roughness Sq of the uneven surface of the transparent article is 26 nm or greater that is measured without any filtering. Measuring without any filtering refers to measuring without using a filter such as a low pass filter or a high pass filter.

Preferably, the surface roughness Sq of the uneven surface of the transparent article is 50 nm or greater that is measured without any filtering.

Preferably, the surface roughness Sq of the uneven surface of the transparent article is 26 nm or less that is measured in a spatial period of 20 µm or greater in the transverse direction and the surface roughness Sq of the uneven surface of the transparent article is less than 50 nm that is measured without any filtering.

Preferably, the uneven surface of the transparent article is formed by an uneven layer containing at least one selected from the group consisting of $SiO_2$, $Al_2O_3$, $ZrO_2$, and $TiO_2$.

Effect of the Invention

The transparent article of the present invention succeeds in reducing the sparkle on a roughened uneven surface such as an anti-glare surface.

MODE FOR CARRYING OUT THE INVENTION

One embodiment of the present invention will now be described.

Figure 1:
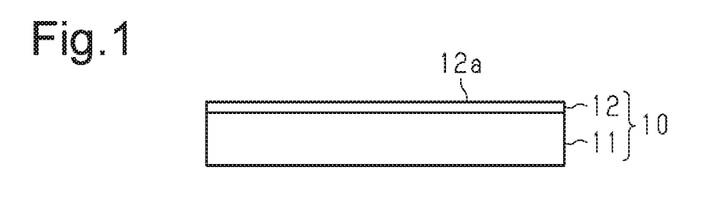
FIG. 1 is an explanatory view of a transparent article.

As shown in FIG. 1, a transparent article 10 includes a transparent base material 11 that is a light-transmissive panel. The transparent base material 11 has a thickness of, for example, 0.1 to 5 mm. Examples of the material for the transparent base material 11 include, for example, glass and resin. The material for the transparent base material 11 is preferably glass, and the glass may be a known glass such as alkali-free glass, alumino-silicate glass, or soda lime glass. Further, a reinforced glass such as chemically reinforced glass, or a crystallized glass such as LAS-type crystallized glass may be used. Among these glasses, alumino-silicate glass is preferably used. Particularly, the use of chemically reinforced glass containing 50% to 80% by mass of $SiO_2$, 5% to 25% by mass of $Al_2O_3$, 0% to 15% by mass of $B_2O_3$, 1% to 20% by mass of $Na_2O$, and 0% to 10% by mass of $K_2O$ is preferred. Examples of the resin include polymethylmethacrylate, poly carbonate, and epoxy resin.

An uneven layer 12 including an uneven surface 12a that is a roughened surface having an uneven structure is arranged on one of the main surfaces of the transparent base material 11. The uneven surface 12a serves as, for example, an anti-glare surface that diffuses light with the uneven structure and reduces reflection. Alternatively, the uneven surface 12a serves as, for example, a surface of which the uneven structure improves the writing comfort when the surface is touched with a stylus pen or the like. The uneven layer 12 and the uneven structure are formed, for example, from a matrix containing an inorganic oxide, such as $SiO_2$, $Al_2O_3$, $ZrO_2$, or $TiO_2$. An example of the uneven structure of the uneven surface 12a is an insular uneven structure that includes insular bulged portions and flat portions arranged therebetween. Preferably, the uneven layer 12 is formed only from an inorganic oxide or organic oxides or does not include an organic compound.

The uneven layer 12 may be formed by applying a coating agent to the surface of the transparent base material 11 and heating the coating agent. The coating agent includes, for example, a matrix precursor and a liquid medium that dissolves the matrix precursor. Examples of the matrix precursor in the coating agent include an inorganic precursor, such as a silica precursor, an alumina precursor, a zirconia precursor, or a titania precursor. A silica precursor is preferred because it decreases the refractive index of the uneven layer 12 wand facilitates control of the reactivity.

Examples of the silica precursor include a silane compound including a hydrolyzable croup and a hydrocarbon group bound to a silicon atom, a hydrolytic condensate of a silane compound, and a silazane compound. It is preferred to include at least one of or both of a silane compound and a hydrolytic condensate thereof for adequately limiting formation of a crack in the uneven layer 12 even when the uneven layer 12 is formed to be thick.

The silane compound includes a hydrolyzable group and a hydrocarbon group bound to a silicon atom. The hydrocarbon group may include a group selected from or a combination of two or more of —O—, —S—, —CO—, and —NR'— (R' is a hydrogen atom or univalent hydrocarbon group) between carbon atoms.

The hydrocarbon group may be a univalent hydrocarbon group bound to one silicon atom or a divalent hydrocarbon group bound to two silicon atoms. Examples of the univalent hydrocarbon group include an alkyl group, an alkenyl croup, and an aryl group. Examples of the divalent hydrocarbon group include an alkylene group, an alkenylene group, and an arylene group.

Examples of the hydrolyzable group include an alkoxy group, an acyloxy group, a ketoxime group, an alkenyloxy group, an amino group, an aminooxy group, an amido group, an isocyanate group, and a halogen atom. An alkoxy group, an isocyanate group, and a halogen atom (particularly, chlorine atom) are preferred since they are well-balanced in terms of stabilizing the silane compound and facilitating hydrolysis of the silane compound. The alkoxy group is preferably an alkoxy group with 1 to 3 carbons, and further preferably a methoxy group or an ethoxy group.

Examples of the silane compound include an alkoxysilane (such as tetramethoxysilane, tetraethoxysilane, or tetraisopropoxysilane), an alkoxysilane including an alkyl group (such as methyltrimethoxysilane or ethyltritmethoxysilane), an alkoxysilane including a vinyl group (such as vinyltrimethoxysilane or vinyltriethoxysilane), an alkoxysilane including an epoxy group (such as 2-(3,4-epoxycyclohexyl) ethyltrimethoxysilane, 3-glycidoxypropyltrimethoxysilane, 3-glycidoxypropylmethyldiethoxysilane, or 3-glycidoxypropyltriethoxysilane), and an alkoxysilane including an acryloyloxy group (such as 3-acryloyloxypropyltrimethoxysilane). Among these silane compounds, the use of at least one of or both of an alkoxysilane and a hydrolytic condensate thereof is preferred, and the use of a hydrolytic condensate of an alkoxysilane is further preferred.

The silazane compound is a compound including a bond of silicon and nitrogen (—SiN—). The silazane compound may be a low-molecular compound or a high-molecular compound (polymer having predetermined repeating unit). Examples of a low-molecular silazane compound include hexamethyldisilazane, hexaphenyldisilazane, dimethylaminotrimethylsilane, trisilazane, cyclotrisilazane, and 1,1,3,3,5,5-hexamethylcyclotrisilazane.

Examples of the alumina precursor include an aluminum alkoxide, a hydrolytic condensate thereof, a water-soluble aluminum salt, and an aluminum chelate. Examples of the zirconia precursor include a zirconium alkoxide and a hydrolytic condensate thereof. Examples of the titania precursor include a titanium alkoxide and a hydrolytic condensate thereof.

The liquid medium included in the coating agent is a solvent selected in accordance with a type of the matrix precursor and dissolves the matrix precursor. Examples of the liquid medium include water, an alcohol, a ketone, an ether, a cellosolve, an ester, a glycol ether, a nitrogen-containing compound, and a sulfur-containing compound.

Examples of the alcohol include methanol, ethanol, isopropanol, butanol, and diacetone alcohol. Examples of the ketone include acetone, methyl ethyl ketone, and methyl isobutyl ketone. Examples of the ether include tetrahydrofuran and 1,4-dioxane. Examples of the cellosolve include methyl cellosolve and ethyl cellosolve. Examples of the ester include methyl acetate and ethyl acetate. Examples of the glycol ether include ethylene glycol monoalkyl ether. Examples of the nitrogen-containing compound include N,N-dimethylacetamide, N,N-dimethylformamide, and N-methylpyrrolidone. Examples of the sulfur-containing compound include dimethyl sulfoxide. The liquid medium may be of a single type or a combination of two or more types.

The liquid medium preferably contains water, or in other words, is preferably water, or a liquid mixture of water and another liquid medium. The other liquid medium is preferably an alcohol, and particularly preferably, methanol, ethanol, isopropyl alcohol, or butanol.

Further, the coating agent may include an acid catalyst that prompts hydrolysis and condensation of the matrix precursor. The acid catalyst is a component that prompts hydrolysis and condensation of the matrix precursor to form the uneven layer 12 promptly. The acid catalyst may be added for hydrolysis and condensation of a raw material (such as alkoxysilane) during the preparation of a solution of the matrix precursor before the preparation of the coating agent, or, may be added after the preparation of essential components. Examples of the acid catalyst include an inorganic acid (such as nitric acid, sulfuric acid, or hydrochloric acid) and an organic acid (such as formic acid, oxalic acid, acetic acid, monochloroacetic acid, dichloroacetic acid, or trichloroacetic acid).

Examples of a method for applying the coating agent include a known wet coating process (such as spray coating, spin coating, dip coating, dye coating, curtain coating, screen coating, inkjet coating, flow coating, gravure coating, bar coating, flexo coating, slit coating, or roll coating). The spray coating facilitates the formation of the uneven structure and is thus the preferred coating process.

Examples of a nozzle used for the spray coating include a twin-fluid nozzle and a single fluid nozzle. A droplet of the coating agent discharged from the nozzle normally has a diameter of 0.1 to 100 μm or preferably 1 to 50 μm. When the diameter of the droplet is 0.1 μm or greater, an uneven structure having a suitable anti-glare effect is promptly formed. When the diameter of the droplet is 100 μm or less, the formation of an uneven structure having a suitable anti-glare effect is facilitated. The diameter of a droplet of the coating agent can be adjusted, for example, by changing the type of the nozzle, spraying pressure, and amount of liquid. For example, with a twin-fluid nozzle, the droplet becomes smaller as the spraying pressure increases, and the droplet becomes larger as the liquid amount increases. The diameter of the droplet corresponds to the Sauter mean diameter measured by a laser measurement instrument.

When applying the coating agent, a coating subject (for example, transparent base material 11) has a surface temperature of, for example, 20° C. to 75° C., preferably 35° C. or greater, or, further preferably, 60° C. or greater. It is preferred that a hydronic heating device be used for heating the coating subject. The humidity when applying the coating agent is, for example, 20% to 80%, or preferably 50% or greater.

The transparent article 10 is configured so that the uneven surface 12a, which is a surface of the uneven layer 12, has a surface roughness Sq set in a certain range. The surface roughness Sq corresponds to a surface roughness Sq measured in accordance with ISO 25178.

More specifically, the uneven surface 12a has a surface roughness Sq (Sq [≥20 μm]), which is measured in a spatial period of 20 μm or greater in a transverse direction, of 50 nm or less. Further, Sq [≥20 μm] is preferably 40 nm or less, further preferably 26 nm or less, or even further preferably 20 nm or less. The setting of Sq [≥20 μm] to 50 nm or less outstandingly reduces the sparkle on the uneven surface 12a of the transparent article 10, and the setting of Sq [≥20 μm] to 26 nm or less further outstandingly reduces the sparkle. For example, the lower limit value of Sq [≥20 μm] is 5 nm.

Further, the uneven surface 12a has the surface roughness Sq (Sq [All]), which is measured without any filtering, of preferably 26 nm or greater, further preferably 50 nm or greater, or even further preferably 60 nm or greater. This effectively reduces reflection on the uneven surface 12a. Thus, the uneven surface 12a is effective when applied as an anti-glare surface. For example, the upper limit value of the surface roughness Sq (Sq [All]), which is measured without any filtering, is 300 nm.

It is preferred that the surface roughness Sq (Sq [≥20 μm]) of the uneven surface 12a is 26 nm or less, which is measured in a spatial period of 20 μm or greater in the transverse direction, and the surface roughness Sq (Sq [All]) of the uneven surface 12a is less than 50 nm, which is measured without any filtering. It is further preferred that the surface roughness Sq (Sq [≥20 μm]) is 20 nm or less, which is measured in a spatial period of 20 μm or greater in the transverse direction, and the surface roughness Sq (Sq [All]) is 40 nm or less, which is measured without any filtering. This provides luster to the uneven surface 12a. Thus, the uneven surface 12a is effective when applied as a surface that improves the writing comfort. For example, the lower limit value of Sq [All] is 26 nm.

The uneven surface 12a has a ratio (Sq [≥40 μm]/Sq [≤20 μm]) of the surface roughness Sq (Sq [≥40 μm]), which is measured in a spatial period of 40 μm or greater in the transverse direction, to the surface roughness Sq (Sq [≤20 μm]), which is measured in a spatial period of 20 μm or less in the transverse direction, of preferably 0.70 or less or further preferably 0.40 or less.

It is preferred that the uneven surface 12a satisfies at least one of the surface roughness Sq (Sq [≥20 μm]) being 5 nm or greater, which is measured in a spatial period of 20 μm or greater in the transverse direction, and the surface roughness Sq (Sq [All]) being 26 nm or greater, which is measured without any filtering. The uneven surface 12a that has the surface roughness Sq of 5 nm or greater measured in a spatial period of 20 μm or greater in the transverse direction is preferred as an anti-glare surface. The uneven surface 12a that has the surface roughness Sq (Sq [All]) of 26 nm or greater, which is measured without any filtering, is preferred as a surface that improves the writing comfort.

The above-described various surface roughness Sq of the uneven surface 12a can be controlled by changing a forming condition of the uneven layer 12. For example, when forming the uneven layer 12 by a spray coating process, Sq [≥20 μm] and Sq [All] are increased as an applied amount of a coating agent is increased, and Sq [≥20 μm] is decreased as the diameter of a droplet of the coating agent is decreased.

The transparent article 10 configured as described above is, for example, arranged and used on a display surface of a display device (for example, display having pixel density of 200 ppi to 800 ppi). In this case, the transparent article 10 may be a member mounted on the display surface of the display device. That is, the transparent article 10 may be retrofitted to the display device.

The operation and advantages of the present embodiment will now be described.

(1) The transparent article 10 includes a transparent base material 11 and a roughened uneven surface 12a arranged on one surface of the transparent base material 11. The uneven surface 12a has a surface roughness Sq (Sq [≥20 μm]) of 50 nm or less, which is measured in a spatial period of 20 μm or greater in a transverse direction.

When Sq [≥20 μm] of the uneven surface 12a is 50 nm or less, the sparkle is reduced more outstandingly than when Sq [≥20 μm] is greater than 50 nm. This reduces the sparkle on the uneven surface 12a of the transparent article.

(2) Preferably, Sq [≥20 μm] of the uneven surface 12a is 26 nm or less. When Sq [≥20 μm] of the uneven surface 12a is 50 nm or less, particularly, when Sq [≥20 μm] is 26 nm or less, the sparkle is reduced more outstandingly than when Sq [≥20 μm] is greater than 26 nm. This further reduces the sparkle on the uneven surface 12a of the transparent article.

(3) When Sq [≥20 μm] of the uneven surface 12a is 5 nm or greater, the uneven surface 12a can be applied as an anti-glare surface in a preferred manner.

(4) When the surface roughness Sq of the uneven surface 12a is 26 nm or greater that is measured without any filtering, the uneven surface 12a can be applied in a preferred manner as a surface that improves the writing comfort.

(5) When the surface roughness Sq of the uneven surface 12a is 50 nm or greater that is measured without any filtering, the reflection on the uneven surface 12a is effectively reduced. Thus, the uneven surface 12a can be applied as an anti-glare surface in a preferred manner.

(6) It is preferred that the surface roughness Sq of the uneven surface 12a is 26 nm or less that is measured in a spatial period of 20 μm or greater in the transverse direction and the surface roughness Sq of the uneven surface 12a is less than 50 nm that is measured without any filtering. The above configuration provides luster while imparting a roughened texture to the uneven surface 12a. Therefore, the uneven surface 12a can be applied in a preferred manner as a surface that improves the writing comfort.

(7) The uneven surface 12a is formed by an uneven layer 12 containing, for example, at least one selected from $SiO_2$, $Al_2O_3$, $ZrO_2$, and $TiO_2$. This further ensures above advantages (1) to (6).

The present embodiment may be modified as described below.

The transparent article 10 may include an additional layer such as an antireflection layer and/or an antifouling layer besides the transparent base material 11 and the uneven layer 12.

The uneven surface 12a is not limited to the surface of the uneven layer 12 arranged on one main surface of the transparent base material 11. For example, the uneven surface 12a may be an uneven surface having an uneven structure formed by another process such as blasting or etching performed on a surface of the transparent base material 11.

The uneven surface 12a may be arranged on two or more surfaces of the transparent base material 11.

Technical concepts obtained from the above embodiment and the modified examples will now be described.

(1) The transparent article, wherein the surface roughness Sq of the uneven surface is 26 nm or less that is measured in a spatial period of 20 μm or greater in a transverse direction.

(2) The transparent article, wherein the uneven surface has a ratio (Sq [≥40 μm]/Sq [≤20 μm]) of the surface roughness Sq (Sq [≥40 μm]), which is measured in a spatial period of 40 μm or greater in the transverse direction, to the surface roughness Sq (Sq [≤20 μm]), which is measured in a spatial period of 20 μm or less in the transverse direction, of 0.70 or less.

(3) A transparent article, comprising a transparent base material and an anti-glare surface arranged on at least one surface of the transparent base material, wherein the anti-glare surface has a surface roughness Sq of 50 nm or less that is measured in a spatial period of 20 μm or greater in a transverse direction.

(4) A transparent article, comprising a transparent base material and a texture-imparting surface arranged on at least one surface of the transparent base material, wherein the texture-imparting surface has a surface roughness Sq of 50 μm or less that is measured in a spatial period of 20 μm or greater in a transverse direction.

(5) A transparent article, comprising a transparent base material and a roughened uneven surface arranged on at least one surface of the transparent base material, wherein the uneven surface has a surface roughness Sq of 50 nm or less that is measured in a spatial period of 20 μm or greater in a transverse direction and the transparent article is used in a display having a pixel density of 200 ppi to 800 ppi.

EXAMPLES

The above embodiment will now be described in further detail with reference to experimental examples. The present invention is not limited to these experimental examples.

Experimental Examples 1 to 16

Experimental examples 1 to 16 of the transparent article each including a uneven surface with a different surface roughness Sq were produced. Specifically, a coating agent was applied using a spray coating apparatus to one surface of a transparent base material, which was formed from a chemically reinforced glass panel having a thickness of 1.3 mm (T2X-1, manufactured by Nippon Electric Glass Co., Ltd.), to form an uneven layer having a roughened uneven surface. The nozzle of the spray coating apparatus was a twin-fluid nozzle, and the coating agent was a solution prepared by dissolving a precursor of the uneven layer (tetraethyl orthosilicate) a liquid medium containing water. The coating agent was applied to the transparent base material at a flow rate of 0.3 kg/hour. The surface roughness Sq of the uneven surface on the transparent articles of experimental examples 1 to 16 were varied by changing the amount of the coating agent applied per unit area when forming the uneven layer, the flow rate of spray air injected with the coating agent, the surface temperature of the transparent base material, and/or the atmospheric humidity as shown in Tables 1 and 2.

TABLE 1

| | Coating Amount ($g/m^2$) | Sprayed Air Flow Rate (1/min) | Surface Temperature (° C.) | Atmospheric Humidity (%) |
| --- | --- | --- | --- | --- |
| Experimental Example 1 | 31 | 50 | 20 | 52 |
| Experimental Example 2 | 63 | 50 | 68 | 52 |
| Experimental Example 3 | 63 | 50 | 71 | 52 |
| Experimental Example 4 | 73 | 70 | 71 | 52 |
| Experimental Example 5 | 63 | 70 | 71 | 52 |
| Experimental Example 6 | 52 | 70 | 20 | 52 |
| Experimental Example 7 | 31 | 50 | 71 | 52 |
| Experimental Example 8 | 31 | 70 | 20 | 52 |
| Experimental Example 9 | 52 | 70 | 71 | 52 |
| Experimental Example 10 | 17 | 70 | 20 | 52 |

TABLE 2

| | Coating Amount ($g/m^2$) | Sprayed Air Flow Rate (1/min) | Surface Temperature (° C.) | Atmospheric Humidity (%) |
| --- | --- | --- | --- | --- |
| Experimental Example 11 | 13 | 50 | 71 | 52 |
| Experimental Example 12 | 22 | 70 | 20 | 52 |
| Experimental Example 13 | 16 | 70 | 20 | 52 |
| Experimental Example 14 | 13 | 70 | 20 | 52 |
| Experimental Example 15 | 17 | 70 | 20 | 48 |
| Experimental Example 16 | 13 | 70 | 20 | 48 |

Measurement of Surface Roughness Sq

The surface roughness Sq of the uneven surface of each transparent article example was measured in accordance with ISO 25178. Specifically, a scanning white-light interference microscope (VertScan, manufactured by Ryoka Systems Inc.) was used to measure three-dimensional data of the uneven surface of the transparent articles. The measurement condition was set as described below.

measurement mode: WAVE mode
filter: 530 white filter
objective lens: objective lens with a magnifying power of 20 times
measurement area: 316.77 μm×237.72 μm
resolution: 640 pixels×480 pixels Subsequently, the measured three-dimensional data underwent a primary surface correction using analysis software VS-Viewer to obtain roughness data. Then, the surface roughness Sq was calculated from the obtained roughness data. The results are shown in Tables 3 and 4. The surface roughness Sq shown in the column of "All" in Tables 3 and 4 corresponds to the surface roughness Sq calculated from the obtained roughness data without any filtering. The surface roughness Sq shown in the column of "≥20 μm" corresponds to the surface roughness Sq calculated in a spatial period of 20 μm or greater in the transverse direction using a low pass filter of FFT2 function of VS-Viewer. The surface roughness Sq shown in the column of "≥40 μm" corresponds to the surface roughness Sq calculated in a spatial period of 40 μm or greater in the transverse direction using the low pass filter of FFT2 function of VS-Viewer. The surface roughness Sq shown in the column of "≤20 μm" corresponds to the surface roughness Sq calculated in a spatial period of 20 μm or less in the transverse direction using a high pass filter of FFT2 function of VS-Viewer.

Further, for each transparent article example, a ratio (Sq [≥40 μm]/Sq [≤20 μm]) of the surface roughness Sq (Sq [≥40 μm]), which is measured in a spatial period of 40 μm or greater in the transverse direction, to the surface roughness Sq (Sq [≤20 μm]) which is measured in a spatial period of 20 μm or less in the transverse direction, was obtained. The results are shown in the column of "Sq [≥40 μm]/Sq [≤20 μm]" in Tables 3 and 4.

Measurement of Sparkle Value

The sparkle value of the uneven surface of each transparent article example was measured. The results are shown in the column of "sparkle value" in Tables 3 and 4.

The sparkle value is a value obtained by arranging a planar light source at a position opposing the surface opposite to the uneven surface of the transparent article, arranging a pattern mask between the transparent article and the planar light source, capturing an image of the transparent article from a position opposing the uneven surface so that the uneven surface of the transparent article and a top surface of the pattern mask are included in a forward depth of field having a permissible circle of confusion diameter of 53 μm, calculating an average value and a standard deviation of a pixel brightness of the pattern mask by analyzing the image data obtained by capturing an image, and dividing the standard deviation by the average value. The sparkle value is a value that indicates the degree of sparkle on the uneven surface and decreases as the sparkle on the uneven surface is reduced. The use of sparkle value allows for a quantitative evaluation of the sparkle that is close to human visual image recognition.

The specific measurement method of the sparkle value will now be described with reference to FIGS. 2 and 3.

Figure 2:
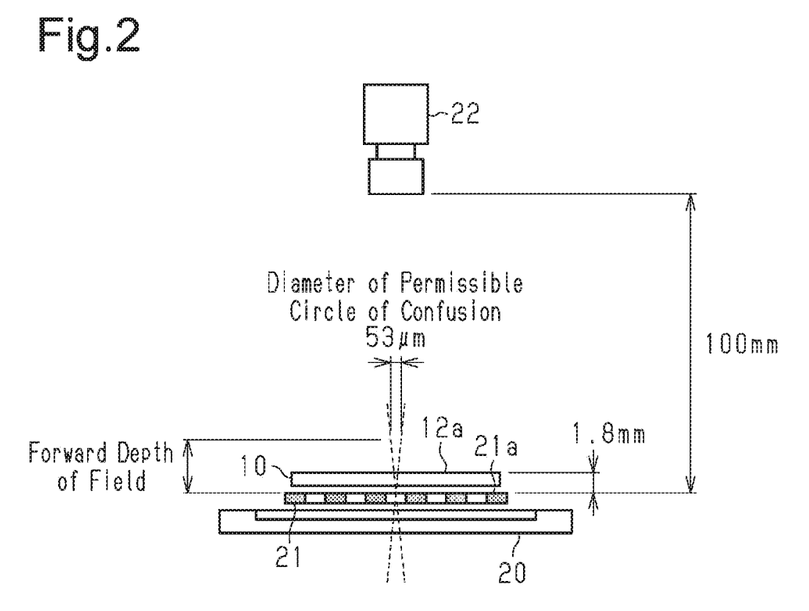
FIG. 2 is an explanatory view illustrating a measurement method of a sparkle value.

As shown in FIG. 2, a pattern mask 21 was placed on a planar light source 20, and the transparent article 10 was placed on the pattern mask 21 so that the surface opposite to the uneven surface 12a was faced toward the pattern mask 21. In addition, a light detector 22 was disposed at a position opposing the uneven surface 12a of the transparent article 10. The light detector 22 was set to have a permissible circle of confusion with a diameter of 53 μm.

Figure 3:
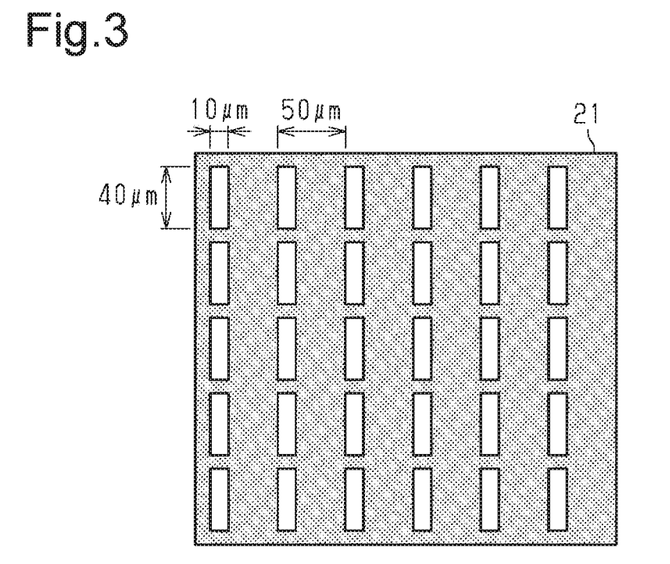
FIG. 3 is an explanatory view of a pattern mask.

As shown in FIG. 3, the pattern mask 21 was a 500 ppi pattern mask having a pixel size of 10 μm×40 μm and a pitch of 50 μm. The light detector 22 that was used was SMS-1000 (manufactured by Display-Messtechnik & Systeme). The light detector 22 had a sensor size of ⅓ type and a pixel size of 3.75 μm×3.75 μm. The focal range of the light detector 22 was set to 100 nm, and the lens aperture diameter was set to 4.5 mm. The pattern mask 21 was arranged so that a top surface 21a was located at the focal position of the light detector 22, and the transparent article was arranged so that the distance between the top surface 21a of the pattern mask 21 and the uneven surface 12a was 1.8 mm.

Then, in a state in which the planar light source 20 emitted light toward the uneven surface 12a of the transparent article 10 through the pattern mask 21, the light detector 22 captured an image of the uneven surface 12a of the transparent article 10 to obtain image data. The obtained image data was analyzed with the SMS-1000 in the sparkle measurement mode (software "Sparkle measurement system") to calculate the pixel brightness of each pixel, the standard deviation of the pixel brightness between pixels, and the average value of the pixel brightness of the pattern mask 21, Based on the obtained standard deviation between pixels and the average value of the pixel brightness, the sparkle value was calculated from equation (1).

sparkle value=[standard deviation of pixel brightness of pattern mask]/[average value of pixel brightness of pattern mask] (1)

Sensory Evaluation of Sparkle

Each transparent article example was arranged with the side of the uneven surface faced upward on a display surface of a display device (H1512 smartphone, manufactured by Huawei) having a resolution of 518 ppi. Ten panelists observed an image of the display device captured through each transparent article example and evaluated whether glare was perceived. The results are shown in the column of "Sensory Evaluation" in Tables 3 and 4. In the column of "Sensory Evaluation", "∘∘" (superior) indicates that one or less panelist perceived glare, "∘" (satisfactory) indicates that two or three panelists perceived glare, "Δ" (bad) indicates that four or more and eight or less panelists perceived glare, and "x" (inferior) indicates that nine or more panelists perceived glare.

Measurement of Gloss Value

The gloss value of the uneven surface of each transparent article example at an incident angle of 60° was measured in accordance with JIS Z8741 (1997). The gloss value is a value measured including the reflection light from the rear surface (surface opposite to uneven s face). The results are shown in the column of "Gloss Value" in Tables 3 and 4. JIS Z8741 (1997) corresponds to ISO 2813:1994 and ISO 7668:1986.

TABLE 3

| | Surface Roughness Sq (nm) | | | | Sq [≥40 μm]/ | Sparkle | Sensory | Gloss |
|---|---|---|---|---|---|---|---|---|
| | All | ≥20 μm | ≥40 μm | ≤20 μm | [Sq [≤20 μm] | Value | Evaluation | Value (%) |
| Experimental Example 1 | 128 | 87 | 37 | 88 | 0.42 | 0.0260 | x | 83 |
| Experimental Example 2 | 104 | 59 | 34 | 85 | 0.40 | 0.0187 | Δ | 70 |

TABLE 3-continued

|  | Surface Roughness Sq (nm) | | | | Sq [≥40 μm]/ | Sparkle | Sensory | Gloss |
| --- | --- | --- | --- | --- | --- | --- | --- | --- |
|  | All | ≥20 μm | ≥40 μm | ≤20 μm | [Sq [≤20 μm] | Value | Evaluation | Value (%) |
| Experimental Example 3 | 110 | 55 | 32 | 95 | 0.34 | 0.0174 | Δ | 63 |
| Experimental Example 4 | 134 | 50 | 28 | 124 | 0.23 | 0.0146 | ○ | 51 |
| Experimental Example 5 | 109 | 37 | 20 | 96 | 0.21 | 0.0135 | ○ | 62 |
| Experimental Example 6 | 65 | 37 | 14 | 52 | 0.27 | 0.0131 | ○ | 100 |
| Experimental Example 7 | 71 | 30 | 18 | 62 | 0.29 | 0.0123 | ○ | 88 |
| Experimental Example 8 | 73 | 26 | 14 | 69 | 0.20 | 0.0092 | ○○ | 88 |
| Experimental Example 9 | 75 | 24 | 13 | 70 | 0.19 | 0.0090 | ○○ | 82 |
| Experimental Example 10 | 42 | 19 | 11 | 37 | 0.30 | 0.0095 | ○○ | 126 |

TABLE 4

|  | Surface Roughness Sq (nm) | | | | Sq [≥40 μm]/ | Sparkle | Sensory | Gloss |
| --- | --- | --- | --- | --- | --- | --- | --- | --- |
|  | All | ≥20 μm | ≥40 μm | ≤20 μm | [Sq [≤20 μm] | Value | Evaluation | Value (%) |
| Experimental Example 11 | 47 | 27 | 17 | 38 | 0.45 | 0.0118 | ○ | 114 |
| Experimental Example 12 | 49 | 23 | 10 | 42 | 0.24 | 0.0090 | ○○ | 119 |
| Experimental Example 13 | 38 | 19 | 10 | 32 | 0.31 | 0.0087 | ○○ | 127 |
| Experimental Example 14 | 33 | 18 | 9 | 28 | 0.32 | 0.0081 | ○○ | 133 |
| Experimental Example 15 | 45 | 17 | 10 | 41 | 0.24 | 0.0077 | ○○ | 116 |
| Experimental Example 16 | 42 | 16 | 9 | 38 | 0.24 | 0.0074 | ○○ | 122 |

Figure 4:
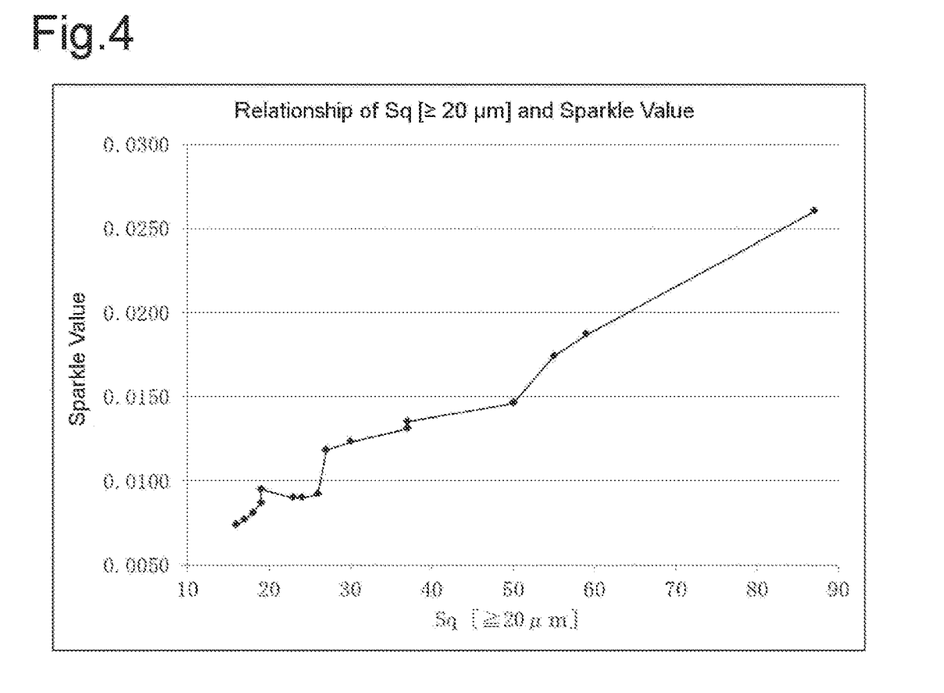
FIG. 4 is a graph illustrating the relationship of Sq [≥20 µm] and the sparkle value.

As shown in Tables 3 and 4, the sparkle value decreased as the surface roughness Sq measured in a spatial period of 20 μm or greater in the transverse direction (Sq [≥20 μm]) was decreased. FIG. 4 is a graph illustrating the relationship of Sq [≥ 20 μm] and the sparkle value. As illustrated in the graph of FIG. 4, the sparkle value outstandingly decreased when the value of Sq [≥20 μm] was between 50 and 55 nm. This indicates that the transparent article has a low sparkle value when the value of Sq [≥20 μm] is at least 50 nm or less. Further, the sparkle value outstandingly decreased when the value of Sq [≥20 μm] was between 26 and 30 nm (particularly, between 26 and 27 nm). This indicates that the transparent article has an even lower sparkle value when the value of Sq [≥20 μm] is at least 26 nm or less. The sensory evaluation shows that the sparkle was greatly reduced when the value of Sq [≥20 μm] was 50 nm or less and when the value of Sq [≥20 μm] was 26 nm or less.

As shown in Table 3, experimental examples 1 to 9 with the surface roughness Sq [All] of 50 nm or greater, which was measured without any filtering, had the gloss value of 100% or less indicating that the reflection reducing effect was high. Particularly, experimental examples 4 to 9 that had Sq [≥20 μm] of 50 nm or less and of which the sparkle was reduced are effective as a transparent article including an anti-glare surface.

Furthermore, as shown in Tables 3 and 4, among the experimental examples having the value of the surface roughness Sq [≥20 μm] of 26 nm or less, which was measured in a spatial period of 20 μm or greater in the transverse direction, and of which the sparkle was greatly reduced, experimental examples 10 and 12 to 16 having the value of the surface roughness Sq [All] of less than 50 nm, which was measured without any filtering, had the gloss value of 100% or greater. Accordingly, experimental examples 10 and 12 to 16 provide luster while imparting a texture of the roughened uneven surface. Therefore, experimental examples 10 and 12 to 16 are particularly effective as a transparent article that improves the writing comfort.

Figure 5:
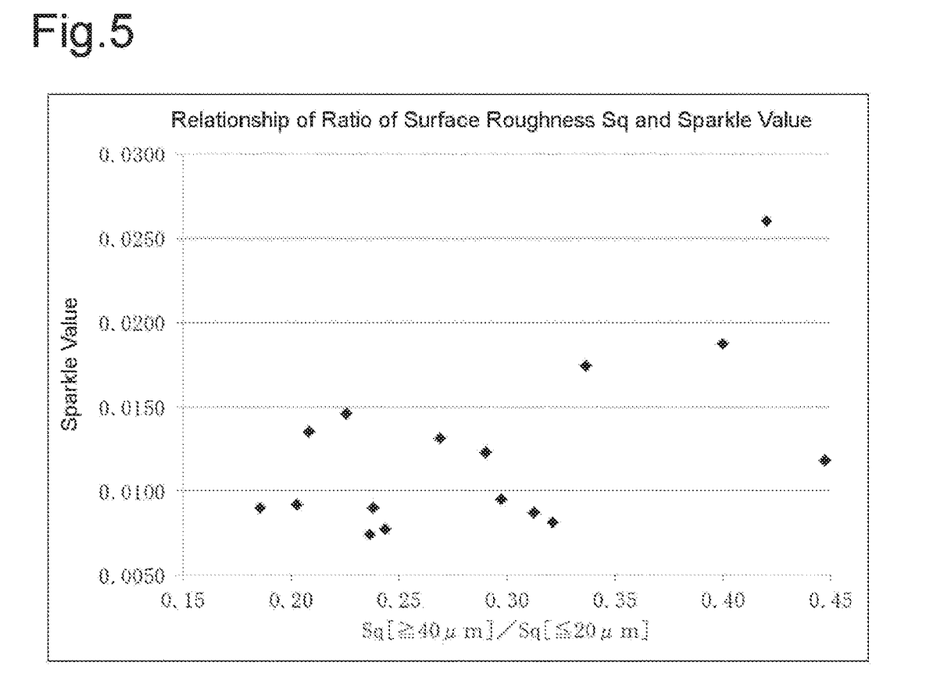
FIG. 5 is a graph illustrating the relationship of a ratio of surface roughness Sq and the sparkle value.

For reference, the graph of FIG. 5 illustrates the relationship between the sparkle value and the ratio (Sq [≥40 μm]/Sq [≤20 μm]) of the surface roughness Sq measured in a spatial period of 40 μm or greater in the transverse direction to the surface roughness Sq measured in a spatial period of 20 μm or less in the transverse direction. The ratio of the surface roughness Sq is a parameter used to identify the anti-glare surface that reduces the sparkle in Patent Document 1. The graph of FIG. 5 does not indicate a strong correlation or an outstanding decrease in the sparkle value when the ratio of the surface roughness Sq is in a certain ranges. This result suggests that the ratio of the surface roughness Sq includes an inappropriate range (for example, 0.70 or less) as a parameter for identifying the uneven surface that reduces the sparkle.

DESCRIPTION OF REFERENCE CHARACTERS 10) transparent article, 11) transparent base material, 12) uneven layer. 12a) uneven surface.

The invention claimed is:

1. A transparent article, comprising:
a transparent base material and a roughened uneven surface arranged on at least one surface of the transparent base material,
wherein the uneven surface has a surface roughness Sq of 50 nm or less that is measured in a spatial period of 20 µm or greater in a transverse direction.

2. The transparent article according to claim 1, wherein the surface roughness Sq of the uneven surface is 5 nm or greater that is measured in the spatial period of 20 µm or greater in the transverse direction.

3. The transparent article according to claim 1, wherein the surface roughness Sq of the uneven surface is 26 nm or greater that is measured without any filtering.

4. The transparent article according to claim 1, wherein the surface roughness Sq of the uneven surface is 50 nm or greater that is measured without any filtering.

5. The transparent article according to claim 1, wherein the surface roughness Sq of the uneven surface is 26 nm or less that is measured in the spatial period of 20 µm or greater in the transverse direction and the surface roughness Sq of the uneven surface is less than 50 nm that is measured without any filtering.

6. The transparent article according to claim 1, wherein the uneven surface is formed by an uneven layer containing at least one selected from the group consisting of $SiO_2$, $Al_2O_3$, $ZrO_2$, and $TiO_2$.

* * * * *